United States Patent
Öhman

(10) Patent No.: US 6,440,240 B1
(45) Date of Patent: Aug. 27, 2002

(54) METHOD FOR GLUING OPTICAL DISC SUBSTRATES TOGETHER

(75) Inventor: Ove Öhman, Uppsala (SE)

(73) Assignee: OTB Group B.V., Eindhoven (NL)

( * ) Notice: Subject to any disclaimer, the term of this patent is extended or adjusted under 35 U.S.C. 154(b) by 0 days.

(21) Appl. No.: 09/622,842

(22) PCT Filed: Feb. 24, 1999

(86) PCT No.: PCT/SE99/00258
§ 371 (c)(1),
(2), (4) Date: Oct. 10, 2000

(87) PCT Pub. No.: WO99/43490
PCT Pub. Date: Sep. 2, 1999

(30) Foreign Application Priority Data

Feb. 24, 1998 (SE) .......................... 9800547-3

(51) Int. Cl.⁷ .............................................. B29D 17/00
(52) U.S. Cl. ........................................ 156/74; 427/240
(58) Field of Search ................ 156/74, 272.2, 156/275.5, 275.7, 285, 286, 295; 428/64.4, 65.2; 369/286; 118/52; 427/240

(56) References Cited

U.S. PATENT DOCUMENTS 4,877,475 A  10/1989  Uchida et al.
6,228,203 B1 *  5/2001  Kotoyori et al. ............ 156/291
6,231,705 B1 *  5/2001  Kanashima et al. ..... 156/273.7

FOREIGN PATENT DOCUMENTS

EP  0 744 739  11/1996
WO  WO 97/36737  10/1997

* cited by examiner

*Primary Examiner*—Michael W. Ball
*Assistant Examiner*—John T. Haran
(74) *Attorney, Agent, or Firm*—Young & Thompson

(57) ABSTRACT

A method for gluing two disc elements together, in particular substrates for digital audio, video or data discs, such as Digital Versatile Discs (DVDs). The disc elements are held essentially horizontally and coaxially with one another so that a gap is formed between the disc elements, after which, in an inner area of the gap, a liquid adhesive is applied in the form of separate strands in the circumferential direction on the facing sides of the disc elements. The disc elements are brought together against one another and made to rotate rapidly in conjunction with the bringing together in order, by the gravitational force of the upper disc element and the capillary force of the adhesive, in association with the centrifugal force on the latter during the rapid rotation, to form a homogeneous and bubble-free adhesive layer of predetermined thickness between the disc elements.

3 Claims, 2 Drawing Sheets

METHOD FOR GLUING OPTICAL DISC SUBSTRATES TOGETHER

FIELD OF THE INVENTION

The present invention relates to a method for gluing two disc elements together, in particular substrates for digital audio, video or data discs, such as Digital Versatile Discs (DVDs), the method comprising the steps a) the two disc elements are held essentially horizontally and coaxially with one another in such a manner that a gap is formed between the disc elements, and b) in an inner area of the gap, a liquid adhesive is applied in the form of at least one strand in the circumferential direction on both the facing sides of the two disc elements.

BACKGROUND OF THE INVENTION

A method of a similar kind is previously known from WO 97/36737. In this known method, a predetermined volume of the adhesive is applied in such a manner that it comes into contact essentially simultaneously with the facing side surfaces of the disc elements, when the adhesive flows out of the outlet of a gluing nozzle introduced into the gap, so that, when simultaneous turning or rotation of the disc elements through approximately one revolution is carried out, an annular adhesive strand is formed, the height of which fills the height of the disc gap, after which the discs are brought together, so that the adhesive, by means of its capillary forces and the weight of the upper disc element, spreads and fills the space between the disc elements to form a thin, homogeneous adhesive layer of predetermined thickness. In the manufacture of certain types of optical discs for data storage, there are extremely stringent requirements that no gas inclusions (air bubbles and the like) should be present in the adhesive layer between the disc elements. It is also desirable to perform the gluing process as rapidly as possible and in such a manner that no surplus adhesive forces its way out of the gap during joining together, which would necessitate an additional collecting stage.

SUMMARY OF THE INVENTION

According to the present invention, it has been found that these requirements can be met in a method of the kind referred to in the introduction, which is characterized in that c) the adhesive is applied in separate, circular-arc-shaped strands with the same radius of curvature on the facing side surfaces of the disc elements and with a combined height of the adhesive strands which is greater than the height of the gap between the disc elements;

d) the disc elements are rotated in relation to one another through approximately one revolution after the application of the respective adhesive strand, one end of the adhesive strand on one disc surface being made to come together with one end of the adhesive strand on the other disc surface, after which e) the disc elements are brought together against one another and made to rotate rapidly in conjunction with the bringing together of the disc elements in order, by means of the gravitational force of the upper disc element and the capillary force of the adhesive, in association with the centrifugal force on the latter during the rapid rotation, to form a homogeneous and bubble-free adhesive layer of predetermined thickness between the disc elements.

By virtue of the fact that one end of one adhesive strand on one disc surface is made to come together with one end of another adhesive strand on the other disc surface after application of the adhesive, a subsequent rotation of the disc elements in relation to one another causes the adhesive strands to be combined to form a single, homogeneous, air-bubble-free adhesive ring by virtue of a shearing action being exerted between the adhesive strands.

BRIEF DESCRIPTION OF THE DRAWINGS

The invention is described in greater detail below with reference to the appended drawings, in which.

DETAILED DESCRIPTION OF THE INVENTION

Figure 1:
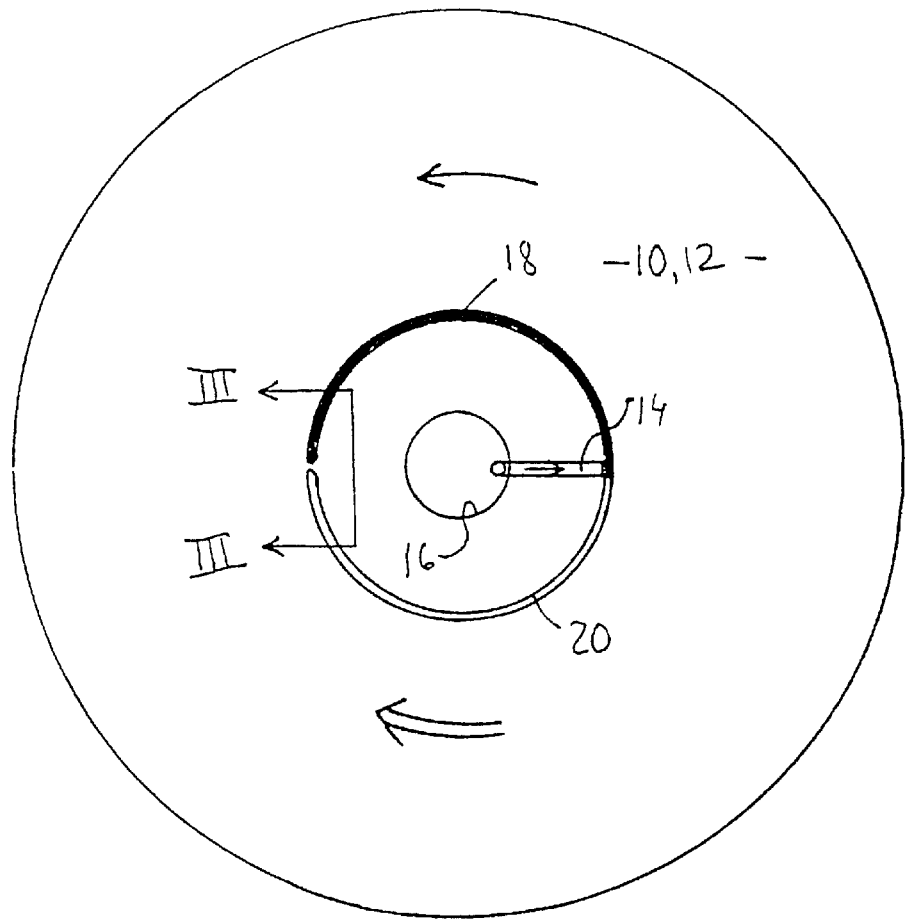
FIG. 1 is a diagrammatic plan view of a DVD, which shows a method according to the invention of applying two semi-circular adhesive strands between an upper and a lower DVD substrate.
Figure 2:
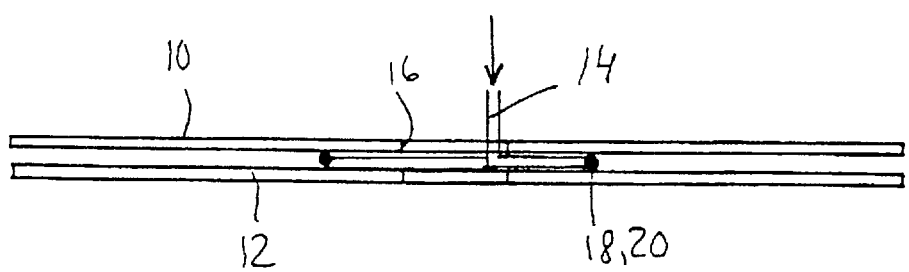
FIG. 2 shows the DVD in FIG. 1 diagrammatically in side view.

FIGS. 1 and 2 show a method according to the present invention for gluing together two disc substrates 10 and 12 for a so-called DVD (Digital Versatile Disc). The disc substrates 10, 12, which can have an information layer on their facing side surfaces and a diameter of approximately 120 mm and a thickness of approximately 0.6 mm, consist of, for example, polycarbonate and are held concentrically separate from one another during an adhesive application stage so as to allow an adhesive application nozzle 14 to be introduced into the gap formed between the disc substrates 10, 12. In the case of the embodiment according to FIGS. 1 and 2, use is made of an L-shaped nozzle 14 which is introduced into the centre hole 16 in the upper disc substrate 10 and is then displaced laterally so as to be capable of dispensing an adhesive in the form of a strand in a radially inner part of the information-carrying area of the disc substrates. The application of the adhesive itself can be carried out in a number of different ways within the scope of the present invention.

Figure 3:
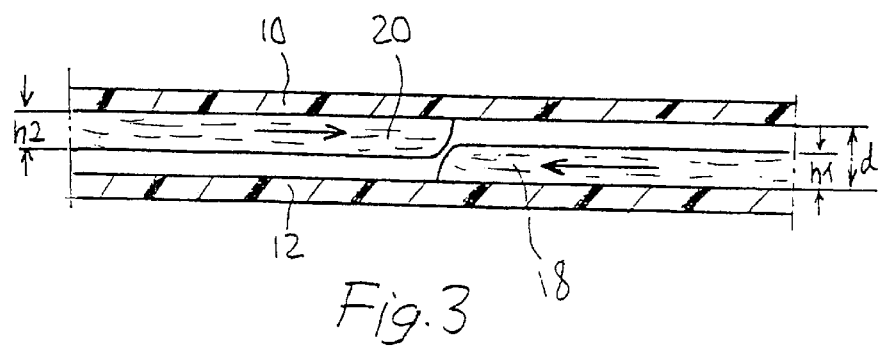
FIG. 3 is a cross-sectional view on enlarged scale along the line III—III in FIG. 1.

In a simple embodiment, the application of the adhesive is carried out by the two disc substrates 10, 12 being rotated through half a revolution in opposite directions of rotation, as indicated in FIG. 1, two semi-circular adhesive strands 18, 20 being formed, which are arranged on facing side surfaces of the disc substrates 10, 12. The total quantity of adhesive applied is adapted to give a finished adhesive layer between the disc substrates 10, 12 within the stipulated thickness range of approximately 40–70 μm for DVDs of the "SD9" type (with a double information layer). It is of considerable importance that the sum of the heights h1 and h2 of the two adhesive strands 18, 20 exceeds the distance d between the disc substrates 10, 12 during application of the adhesive, that is to say h1+h2>d (FIG. 3), as a result of which the adhesive strands 18, 20, on continued rotation of the disc substrates 10, 12 through half a revolution in opposite directions, are made to come together with one another and, with mutual shearing, form a common, homogeneous and air-bubble-free adhesive strand which bridges the gap interspace d.

After application and homogenization of the adhesive strands to form a single circular adhesive strand, the upper disc substrate 10 is made to drop down, by its gravitational force, towards the lower disc substrate, a brief rapid rotation of the disc substrates being initiated at the same time so that the adhesive is caused to be rapidly distributed uniformly between the disc substrates to form a thin, homogeneous adhesive layer which is free from air inclusions, this being achieved by means of a combination of the capillary forces of the adhesive and the centrifugal forces acting on the adhesive during the rapid rotation.

Figure 4:
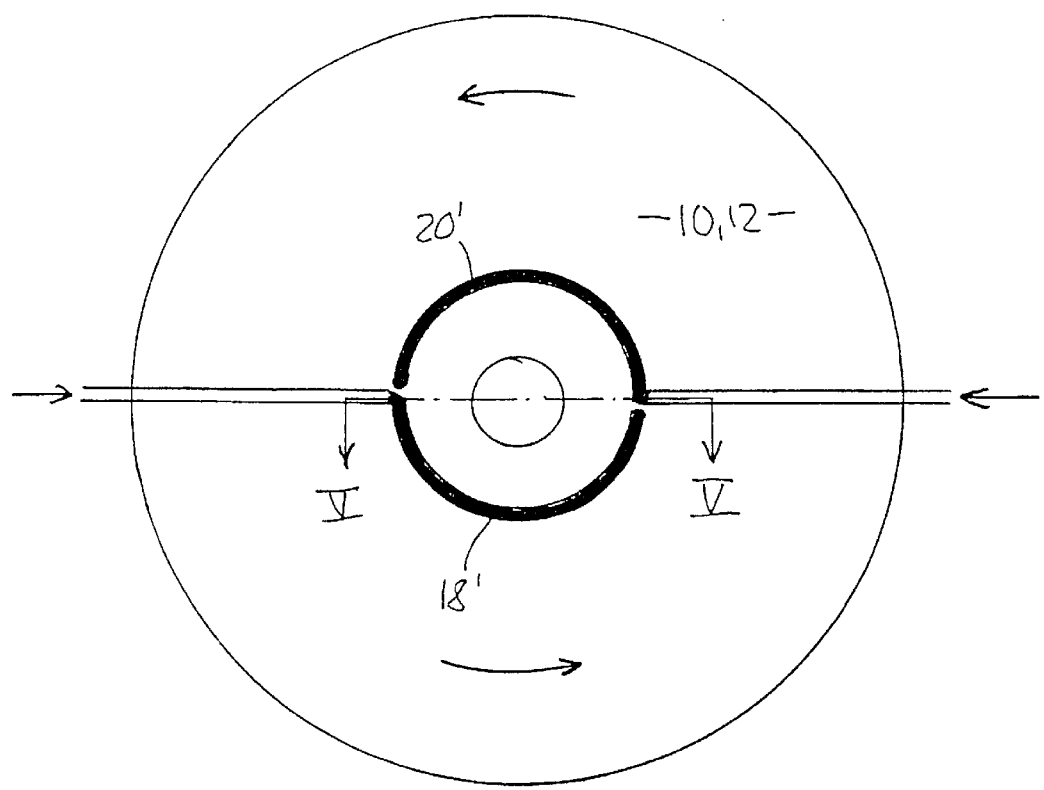
FIG. 4 shows another method of arranging adhesive strands in a gap between two DVD substrates.
Figure 5:
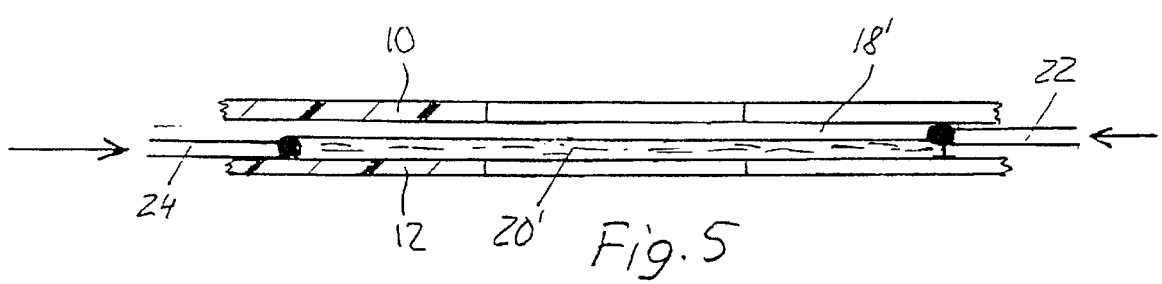
FIG. 5 is an enlarged cross-sectional view along the line V—V in FIG. 4.

FIGS. 4 and 5 show another possible embodiment of the method according to the invention, in which two diametrically opposite nozzles 22, 24 are inserted radially from outside into the interspace between the disc substrates 10, 12 and each apply a semi-circular adhesive strand 18', 20' during a rotation of the disc substrates 10, 12 through approximately 180° in the same direction. As can be seen in FIG. 5, the nozzle 22 applies a semi-circular adhesive strand 18' on the underside of the upper disc substrate 10 while the nozzle 24 simultaneously applies a semi-circular adhesive strand 20' on the top side of the lower disc substrate 12 during a rotation of the disc substrates 10, 12 through approximately half a revolution in the same direction of rotation. In this respect, the conditions with regard to the height of the adhesive strands 18', 20' and the distance between the disc substrates 10, 12 are similar to those in the embodiment according to FIGS. 1–3, it being possible for the adhesive strands 18', 20', on continued rotation of the disc substrates 10, 12 through half a revolution in opposite directions, to be made to come together with one another and, with a mutual shearing action, form a common, homogeneous and air-bubble-free circular adhesive strand. Then the upper disc substrate 10 is dropped towards the lower substrate, and both disc substrates are rapidly rotated briefly so that the adhesive in the circular adhesive strand is rapidly distributed uniformly to form a thin and bubble-free adhesive layer of predetermined thickness by means of a combination of capillary forces of the adhesive and centrifugal forces acting thereon.

Within the scope of the invention, it is thus possible to produce a thin, bubble-free adhesive layer between the disc substrates by applying a number of arc-shaped adhesive strands with the same radius on the two inner sides of the disc substrates and then bringing the disc substrates together and at the same time rapidly rotating the same briefly. The gluing nozzle or nozzles can be introduced from the centre hole 16 of one disc substrate (FIGS. 1, 2) or from the side from outside (FIGS. 4, 5). The nozzles can be directed radially or tangentially and have axial or laterally directed outlets.

What is claimed is:

1. Method for gluing two disc elements together, comprising the steps:

a) holding the two disc elements (10, 12) essentially horizontally and coaxially with one another in such a manner that a gap is formed between the disc elements;

b) applying in an inner area of the gap, a liquid adhesive in the form of at least one strand (18, 20; 18', 20') in a circumferential direction on both facing sides of the two disc elements (10, 12), characterized in that c) applying the adhesive in separate, circular-arc-shaped strands (18, 20; 18', 20') with a same radius of curvature on the facing side surfaces of the disc elements (10, 12) and with a combined height (h1+h2) of the adhesive strands which is greater than a height (d) of the gap between the disc elements;

d) rotating the disc elements (10, 12) in relation to one another through approximately one revolution after the application of the respective adhesive strand, one end of the adhesive strand on one disc surface being made to come together with one end of the adhesive strand on the other disc surface, after which e) bringing together the disc elements (10, 12) against one another and made to rotate rapidly in conjunction with the bringing together of the disc elements in order, by means of a gravitational force of an upper disc element and a capillary force of the adhesive, in association with a centrifugal force on the latter during the rapid rotation, to form a homogeneous and bubble-free adhesive layer of predetermined thickness between the disc elements.

2. Method according to claim 1, characterized in that the adhesive is applied by means of a single nozzle, the two disc elements (10, 12) each being rotated through up to approximately half a revolution in opposite directions.

3. Method according to claim 1, characterized in that the adhesive is applied by means of two distinct, diametrically separated nozzles (22, 24), the two disc elements (10, 12) each being rotated through up to approximately half a revolution in the same direction.

* * * * *